E. A. DUNN.
FILING SYSTEM.
APPLICATION FILED NOV. 23, 1910.

1,002,237.

Patented Sept. 5, 1911.

UNITED STATES PATENT OFFICE.

EDWARD A. DUNN, OF NEWTON, MASSACHUSETTS.

FILING SYSTEM.

1,002,237. Specification of Letters Patent. Patented Sept. 5, 1911.

Application filed November 23, 1910. Serial No. 593,853.

*To all whom it may concern:*

Be it known that I, EDWARD A. DUNN, of Newton, in the county of Middlesex and State of Massachusetts, have invented certain new and useful Improvements in Filing Systems, of which the following is a specification.

This invention relates to index systems of the type which employs alphabetical and numerical sub-divisions, and the invention relates especially to improvements in systems which employ a series of cards designated by alphabetical sub-divisions, each of which sub-divisions has also a distinct number of its own.

A particular object of the invention is to provide a card index or filing system of this character wherein the projections or tabs of the members are so arranged and marked relatively to each other as to facilitate proper filing, and the detection of mis-placed matter.

Further objects of the invention are to provide such an index which will reduce labor costs by increasing the facility of use; to provide an index which is expansive to avoid necessity for revising the index from time to time; to provide an index which will enable surnames to be sub-divided by Christian names, thus facilitating reference and posting especially where surnames are common; and to provide an index having sub-divisions that may be used in common in different departments of a business.

To these ends the invention consists in the card index system substantially as hereinafter described and claimed.

Of the accompanying drawings,—Figure 1 is a front elevation of a sufficient number of a set of members to illustrate my invention, Figs. 2 and 3 are front elevations of two cards which may be used with the guide members shown in Fig. 1.

The complete system includes, of course, sufficient members to cover the entire alphabet, and said members will usually be arranged in boxes or drawers sufficient in number to accommodate the entire set. And of course the alphabet may be divided as extensively as required by the demands of the user. The sub-divisional arrangement provided for in the set of which a portion is illustrated herein, comprises 40 sub-divisions of the entire alphabet: for instance, two sub-divisions of "A", three of "B", two of "C", etc., as indicated by the printing of the field or index $a'$ of the front guide card $a$ in Fig. 1. Obviously, this selection of the number of sub-divisions of the complete alphabet is arbitrary, and may be more extensive, or smaller. For, convenience of description, and not with limiting effect, this will be hereinafter referred to as the major sub-division of the alphabet, to distinguish it from the further, or minor, sub-division of each of the major sub-divisions, according to Christian or firm names as hereinafter described. The major sub-divisions are numbered consecutively, as 1 to 40, so that each such sub-division is numerically individualized as explained in my application 553,537, filed April 5, 1910, and said sub-divisions are used for surnames so that the name "Berger", for instance, would be known to belong in division "Be" which is individualized by the numeral "4". A further sub-dividing by Christian or firm names is provided for by a separate set which preferably comprises ten guide-cards $b$ for dividing the alphabet into ten sub-divisions herein referred to as the minor sub-divisions. Each major guide card $a$ preferably bears printed fields or indexes $a'$ $a^2$ which, for the sake of brevity, will be hereinafter referred to as the major and minor indexes respectively. But for some purposes it will be sufficient to have these indexes on only occasional guide cards, or even to dispense entirely with such printing on the guide cards themselves, using instead a card or sheet in a location convenient to the system, such card or sheet bearing the indexes $a'$ $a^2$. Of these indexes, the one indicated at $a'$ shows the major sub-divisions and their individual numerals already described, while the index $a^2$ shows the minor sub-divisions and their individual numerals, there being preferably ten of them numbered "0" to "9", for use in connection with Christian and firm names as claimed in my application 570,276, filed July 5, 1910. The object of employing ten sub-divisions in the minor field $a^2$ is to provide for expansion of this feature of the system by prefixing surname numerals from the major index to either one of the ten sub-divisions shown, if desired, and especially to prevent duplication of numbers when the numerals of the major index are prefixed to the numerals of the minor index as described. For instance, if there were 12 sub-divisions in the minor set illustrated, there would then be a "50" and a "51" of divison "Be4" lapping over into the next division "Br5".

Whether the indexes are borne by the cards $a$, $b$ themselves, or by a separate card or sheet, there will be one card $a$ for each major sub-division, and it is provided with a projection or tab $a^3$ bearing an alphabetical sub-division and its numeral. In other words, there are as many cards $a$ as there are major sub-divisions. And in the embodiment of the invention illustrated, there are ten cards $b$ for each major sub-division, said cards $b$ having projections or tags $b'$, each bearing one of the minor alphabetical sub-divisions and its appropriate numeral. To make the complete system clear, it will be stated that there are, in the particular arrangement, a fragment of which is illustrated, forty cards $a$, and ten times as many cards $b$, because there are ten cards $b$ for each major sub-division. Fig. 1 simply shows the cards belonging to major sub-division "Be4", and the first card $a$ of the next major sub-division "Br5".

The tabs $b'$ bear alphabetical sub-divisions corresponding with those of the minor index $a^2$ and also bear the same corresponding numerals, the numerals preferably following the alphabetical sub-divisions on said tabs, although the numerals might precede the letters. The reasons for this arrangement are that the major guide cards $a$ are used for the proper classification of surnames. For instance, any surname, the first two letters of which consist of "Be" up to, but not including "Br" would belong beyond the front card shown in Fig. 1.

The minor guide cards $b$ may be referred to as Christian and firm name guides, because they are employed to sub-divide according to Christian names or firm names. Said minor guide cards $b$ have their tabs $b'$ in assorted positions, by which I mean that said tabs $b'$ are in lateral stepped positions. There are ten cards in each set of units $b$, and all of the sets of units $b$ are alike in configuration and in the characterizations of their tabs.

As indicated in Fig. 2, any card $c$ which is to be known by the name of a certain person, has applied thereto numerals taken from both the major and minor indexes $a'$ $a^2$. The name "James Berger" receives the number 46, because the "Be" of the surname denotes that it belongs in the major division 4, while the Christian name "James" shows that it falls in sub-division 6 of the minor index $a^2$. Fig. 3 illustrates a selected card $c$ to show that while the "Bi" of the surname "Binner" causes that card to be given the numeral 4 from the major index $a'$, because the "Bi" falls between "Be" and "Br", the "C" of the Christian name "Charles" gives the card the numeral 2 from the minor index $a^2$.

In substantially the center of Fig. 1, there is shown the tab of a guide bearing the name "Bennett". This is merely one of quite a number of very well known and common names. It might be Smith or Brown or Jones, but the name Bennett is selected for illustration, because it would necessarily have the same numerical indication "4" as the front card shown in Fig. 1. In the system, sufficient cards $a$ are furnished with the tabs left blank. Then if the list of names grows so as to include a large number of Bennetts, a card $a$ is taken and the name Bennett written on its tab as also the numeral 4. Then a set of minor guide cards $b$ may be employed behind the major card bearing the name Bennett so as to sub-divide the name Bennett according to Christian or firm names. This disposes of what are termed "common names". The cards used for these common names or special names may have a different color or they may bear a star or some other symbol to avoid possibility of mis-filing. The use of such "common name" or "special name" guide cards relieves congestion and allows the entire list to expand while still employing the same guide arrangement which facilitates both reference and posting. Of course such cards as that marked "4 Bennett 4", enables any common name to be divided ten times by Christian names. It may be explained here that the minor cards having the tabs bearing "&O" are employed for firm or corporation names or any miscellaneous names.

I prefer that the cards $b$ shall bear the same index fields as those shown at $a'$ $a^2$ on the major guide cards, but do not limit myself thereto.

By positioning the tabs of the major or surname guide cards $a$ at, or near the mid-length of the cards, the several tabs $a^3$ will always be spaced by the minor cards $b$, so that every projection or tab $a^3$ is visible even before any cards are inserted in the file. And since the tabs or projections $b'$ of the minor guide cards are in assorted or lateral stepped positions from the extreme left to the extreme right, it necessarily follows that in the complete system the projections or tabs $a^3$ can never be close to any of the projections or tabs $b'$ so as to unduly conceal the latter. In the complete system, the 40 major guide cards $a$ (or the 80 or other sub-divisional arrangement) constitutes a set of units, the mid-length tabs of which are numbered in sequence and in the complete system there will be as many sets of minor guide cards as there are major guide units. For instance, if the alphabet is divided into 40 divisions as illustrated, then there will be 40 major guides *a* and 40 sets (10 in each set) of the minor guide cards *b*. It is customary or usual for a sufficient number of extra sets of minor guide cards *b* to be provided for the expansion hereinbefore described when common or special names become numerous in the list. Since the different sets of ten minor guide cards *b* are all alike, it is not necessary to carry or keep in stock a large number of different cards. That is, as many extra sets of minor guide cards should be purchased or kept in stock as may be desired.

The system, as will now be understood, comprises a plurality of units arranged in sets and having projections or tabs, the tabs of one set *a*, being in a row from front to rear, the tabs of every one of the other sets of units *b* being assorted as described and consequently in such arrangements as to always be distinguishable from the tabs of the units *a*. Consequently the tabs of one set can never interfere with those of another set of units.

I claim:

1. In a filing system a set of major guide cards having mid-length tabs numbered in sequence, each tab having also an alphabetical sub-division, and sets of minor guide cards between the major cards, said minor cards having tabs in assorted or lateral stepped positions, the sets of minor cards being alike and the tabs thereof having alphabetical subdivisions individualized by numerals, in combination with a major and a minor index each having alphabetical subdivisions individualized by numerals, and corresponding to the respective subdivisions, whereby an indexed element between the cards may be indicated by combining an individualized number of said major index with an individualized number of the minor index.

2. In a filing system a set of major guide cards having mid-length tabs numbered in sequence, each tab having also an alphabetical subdivision, and sets of minor guide cards between the major cards, each set of minor guide cards comprising ten units having tabs in assorted or lateral stepped positions and bearing the numerals 0–9, in combination with a major and a minor index each having alphabetical subdivisions individualized by numerals, and corresponding to the respective subdivisions, whereby an indexed element between the cards may be indicated by combining an individualized number of said major index with an individualized number of the minor index.

3. In a filing system two sets of units having projections or tabs in separate distinguishable arrangements, the tabs of one set having numerically individualized subdivisions of the alphabet, and the tabs of the other set also having numerically individualized subdivisions of the alphabet but divided differently from those of the first mentioned set, in combination with a major and a minor index each having alphabetical subdivisions individualized by numerals, and corresponding to the respective subdivisions, whereby an indexed element between the cards may be indicated by combining an individualized number of said major index with an individualized number of the minor index.

4. A filing system including two sets of units having projections or tabs in arrangements distinguishable from each other, said tabs having alphabetical sub-divisions, the alphabet being differently divided for the two sets, and major and minor indexes corresponding with the sub-divisions of the tabs of the two sets of units, whereby an indexed element between the cards may be indicated by combining a subdivision of the major index with a subdivision of the minor index.

5. A filing system having two sets of units provided with tabs bearing alphabetical subdivisions individualized by numerals, the tabs of one set being in a row from front to rear, the tabs of the other set being assorted, the subdivisions of one set differing from those of the other set, in combination with a major and a minor index each having alphabetical subdivisions individualized by numerals, whereby an indexed element between the cards may be indicated by combining an individualized number of the major index with an individualized number of the minor index.

6. A filing system having two sets of units provided with tabs bearing alphabetical subdivisions individualized by numerals, the tabs of one set being in a row from front to rear, the tabs of the other set being assorted, the alphabetical designations of one set being divided into ten groups and individualized by the numerals 0–9, in combination with a major and a minor index each having alphabetical subdivisions individualized by numerals, whereby an indexed element between the cards may be indicated by combining an individualized number of the major index with an individualized number of the minor index.

In testimony whereof I have affixed my signature, in presence of two witnesses.

EDWARD A. DUNN.

Witnesses:
A. W. HARRISON,
P. W. PEZZETTI.